United States Patent
Meyer et al.

(10) Patent No.: US 9,702,360 B2
(45) Date of Patent: Jul. 11, 2017

(54) SPLIT SHELL SHAFT COUPLING FOR SUBMERSIBLE PUMP ASSEMBLIES

(71) Applicant: Baker Hughes Incorporated, Houston, TX (US)

(72) Inventors: Aron M. Meyer, Pryor, OK (US); David Tanner, Broken Arrow, OK (US); Chase Wichert, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 347 days.

(21) Appl. No.: 14/586,332

(22) Filed: Dec. 30, 2014

(65) Prior Publication Data

US 2016/0186731 A1 Jun. 30, 2016

(51) Int. Cl.
| | | |
|---|---|---|
| F04B 35/06 | (2006.01) | |
| F04C 13/00 | (2006.01) | |
| F16D 1/10 | (2006.01) | |
| F16D 1/104 | (2006.01) | |
| F04B 47/06 | (2006.01) | |
| F04C 15/00 | (2006.01) | |
| F04C 2/107 | (2006.01) | |

(52) U.S. Cl.
CPC ............ *F04C 13/008* (2013.01); *F04B 47/06* (2013.01); *F04C 15/0061* (2013.01); *F16D 1/10* (2013.01); *F16D 1/104* (2013.01); *F04C 2/1071* (2013.01); *F04C 2240/70* (2013.01); *F16D 2001/103* (2013.01)

(58) Field of Classification Search
CPC .. F04C 13/008; F04C 15/0061; F04C 2/1071; F04C 2240/70; F04B 47/06; F16D 1/10; F16D 1/104; F16D 2001/103; Y10T 403/7026; Y10T 403/7035
USPC .......................................... 417/423.6; 464/182
See application file for complete search history.

(56) References Cited

U.S. PATENT DOCUMENTS

| | | | |
|---|---|---|---|
| 6,752,560 B2 * | 6/2004 | Wilson | F04D 29/044 403/1 |
| 6,883,604 B2 | 4/2005 | Mack et al. | |
| 7,325,601 B2 | 2/2008 | Mack et al. | |
| 7,775,779 B2 * | 8/2010 | Sheth | F04D 13/022 403/300 |

(Continued)

OTHER PUBLICATIONS

Drawing entitled: Pinned Sleeve Prior Art.

*Primary Examiner* — Charles Freay
(74) *Attorney, Agent, or Firm* — Bracewell LLP; James E. Bradley

(57) ABSTRACT

An electrical submersible pump assembly has a number modules including a pump, a motor and a pressure equalizer. Each module has a rotatable shaft with a splined end that joins a splined end of another module, and those splined ends may differ in dimensions. A coupling that joins the shafts has a first shell has a splined bore that mates with the splined end of the first shaft. A second shell has a splined bore that mates with the splined end of the second shaft. An adopter has a first splined end in mating engagement with the splined bore of the first shell and a second splined end in mating engagement with the splined bore of the second shell. Fasteners secure the adapter to the shells. An annular seal isolates fluid communication between the first shell bore and the second shell bore.

18 Claims, 2 Drawing Sheets

(56) References Cited

U.S. PATENT DOCUMENTS

| | | | |
|---|---|---|---|
| 7,900,720 B2* | 3/2011 | Hall | E21B 10/62 |
| | | | 175/325.2 |
| 8,545,125 B2 | 10/2013 | Brown et al. | |
| 8,591,205 B2 | 11/2013 | Brown et al. | |
| 2006/0222537 A1* | 10/2006 | Kilty | F04D 13/021 |
| | | | 417/423.6 |

* cited by examiner

SPLIT SHELL SHAFT COUPLING FOR SUBMERSIBLE PUMP ASSEMBLIES

FIELD OF THE DISCLOSURE

The invention relates to devices for coupling different dimensioned shafts of submersible pump assembly modules.

BACKGROUND OF THE DISCLOSURE

Electrical submersible pump assemblies (ESP) are commonly used to pump well fluid from oil wells. Conventionally, ESPs have been made up of a series of interconnectable modular sections including one or more pump sections with an associated fluid intake, a motor section and a seal or pressure equalizer section. Each of these sections includes an outer housing and a central rotatable drive shaft. The drive shaft has at least one splined end that will join a drive shaft of an adjacent module for rotation in unison.

A coupling sleeve with internal splines rotationally connects the two drive shafts. The coupling sleeve is a cylindrical member with internal splines located at each end. The housings of the modules are joined usually by bolting flanges together; alternately, an internally threaded rotatable collar may be employed to secure the housings.

An assembled ESP can be quite lengthy, up to and more than 100 feet. Normally, the separate modules are brought to a well site, then connected together. When two modules are joined to each other, a technician inserts a coupling sleeve over one of the shaft splined ends and axially aligns the two modules. The modules are brought toward each other, causing the splined end of the other module to stab into the coupling sleeve. The technician then secures the housings to each other.

The modules of an ESP are often interchangeable with modules of different capacities. For example, a particular pump module may be operable with a variety of different motor modules, and vice-versa. The shafts and their splined ends may differ from each other, requiring a variety of couplings. One coupling used in the past for mating different configured shaft splined ends employs a sleeve insert that is pressed into one part of the bore of the coupling. The sleeve has a splined configuration in its inner diameter that differs from the integrally formed spline configuration in the oilier part of the bore. Axially extending pins between outer diameter of the sleeve and the bore fix the sleeve to the coupling for rotation.

SUMMARY OF THE INVENTION

An electrical submersible pump assembly has a plurality of modules including a pump, a motor and a pressure equalizer. A first one of the modules has a rotatable first shaft with a splined end. A second one of the modules has a rotatable second shaft with a splined end. A first shell has a splined bore dimensioned such that it intermeshes with the splined end of the first shaft. A second shell has a splined bore dimensioned such that it intermeshes with the splined end of the second shaft. The splined bores of the first and second shells are coaxially aligned along an axis of the assembly. A torque transfer member secures the first and second shells together such that torque of the first shaft passes through the first shell to the second shell and from the second shell to the second shaft.

The torque transfer member has a first splined end that intermeshes with the splined bore of the first shell. The torque transfer member has a second splined end that intermeshes with the splined bore of the second shell. The splined end of the first shaft intermeshes with an outer portion of the splined bore of the first shell. The splined end of the second shaft intermeshes with an outer portion of the splined bore of the second shell. The second splined end of the torque transfer member optionally may have different dimensions than the first splined end.

In the embodiment shown, a first retaining ring inserts into mating grooves formed on a first end of the torque transfer member and in the splined bore of the first shell. A second retaining ring inserts into mating grooves formed on a second end of the torque transfer member and in the splined bore of the second shell. An annular seal seals between the first splined end of the torque transfer member and the splined bore of the first shell.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, mat the drawings illustrate only a preferred embodiment of the disclosure and is therefore not to be considered limiting of its scope as the disclosure may admit to other equally effective embodiments.

DETAILED DESCRIPTION

Figure 1:
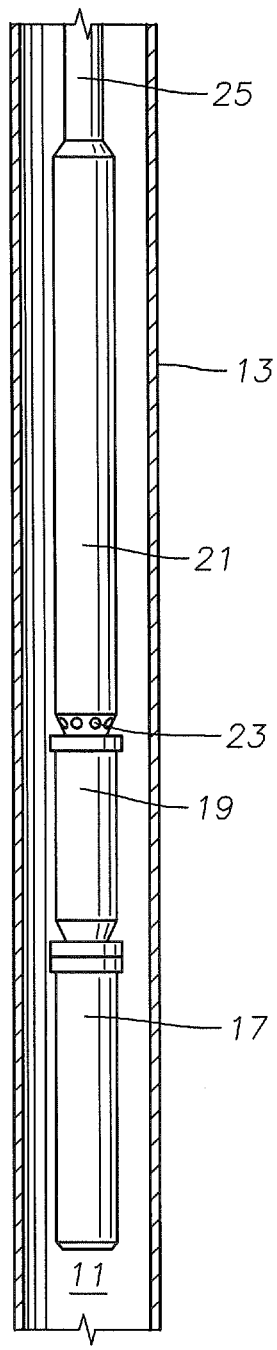
FIG. 1 is a schematic side view of a pump assembly constructed in accordance with this invention.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, a well 11 has casing 13 that is perforated or has other openings to admit well fluid. A pump assembly 15 is suspended in well 11 to pump well fluid from well 11. Although shown installed vertically, pump assembly 15 could be located within on inclined or horizontal section of well 11, or it could be mourned exterior of well 11 for boosting the pressure of well fluid flowing from the well.

Pump assembly 15 includes a motor 17, normally a three-phase electrical motor. A seal section or pressure equalizer 19 connects to motor 17 if pump assembly 15 is submersed. Seal section 19 has components, such as a bladder or bellows, for reducing a pressure differential between dielectric lubricant contained in motor 17 and the hydrostatic pressure of the well fluid in well 11 surrounding motor 17. Although shown above motor 17, seal section 19 could be mounted to a lower end of motor 17.

A pump 21 connects to the opposite end of seal section 17. Pump 21 may be a centrifugal pump with numerous stages, each stage having an impeller and a diffuser. Alternately, pump 21 may be a progressing cavity pump, having a helical rotor that rotates within an elastomeric stator. Pump 21 could also be a reciprocating type. Pump 21 has an intake 23 for drawing in well fluid. A gas separator (not shown) may be mounted between motor 17 and pump 21, and if so, intake 23 would be located in the gas separator. A string of production tubing 25 suspends pump assembly 15 in casing 13 in most installations.

Motor 17, seal section 19, and pump 21 are in separate modules brought to the well site, then secured together. Pump assembly 15 could have other modules, including a gas separator or additional pumps and motors connected in tandem. The various modules are connected either with bolted flanges or with rotatable threaded collars.

Figure 2:
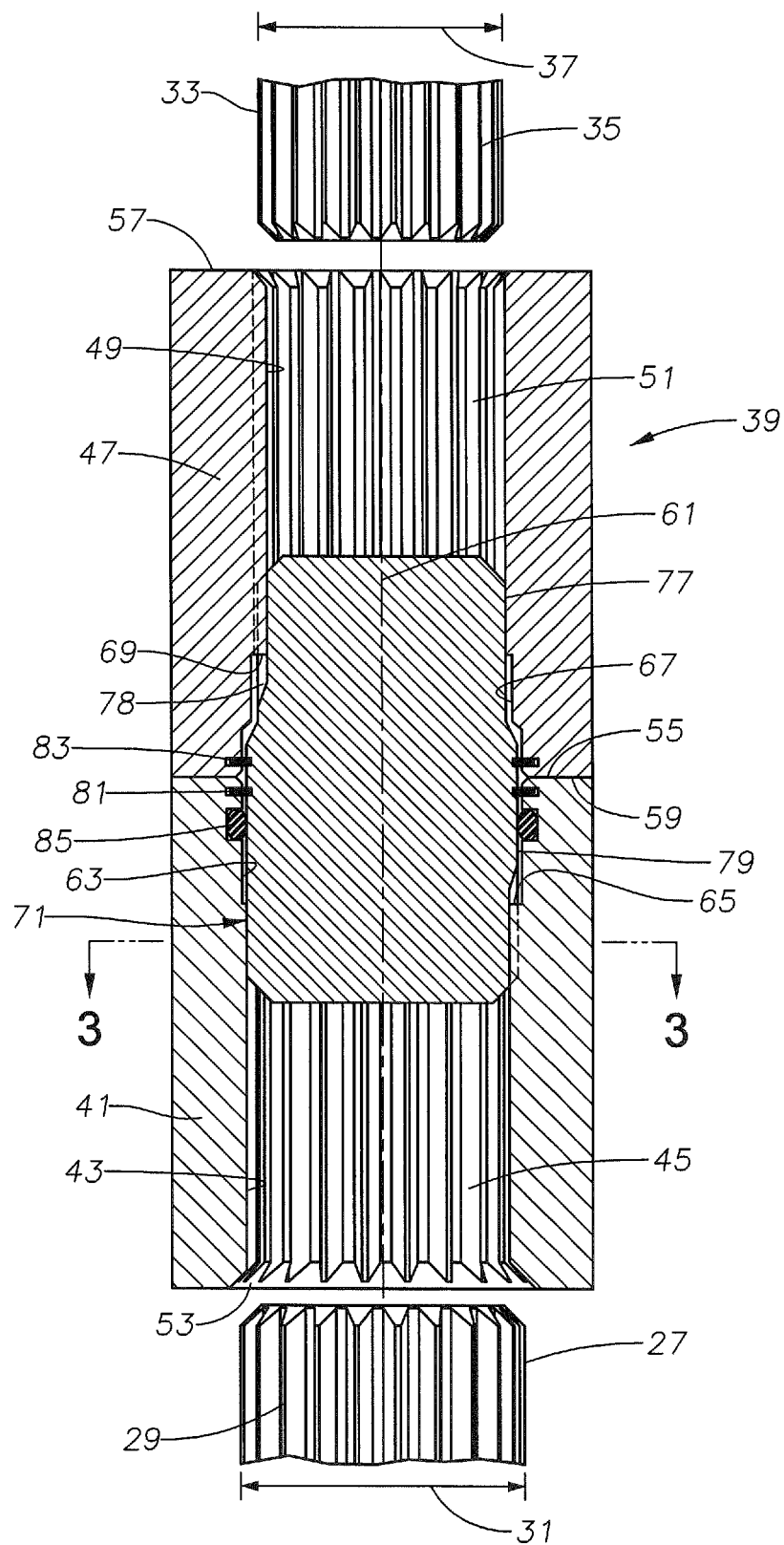
FIG. 2 is an enlarged sectional view of a coupling for coupling together shafts from two of the modules of the pump assembly of FIG. 1 and taken along the line 2-2 of FIG. 3.

Referring to FIG. 2, a first shaft 27 is rotatably mounted in a first one of the modules, such as motor 17. First shaft 27 has a splined end 29 with an outer diameter 31, measured at the crests of the splines. A second shaft 33 is rotatably mounted in a second one of the modules, such as seal section 19. Second shaft 33 also has a spline end 35. Since the modules of pump assembly 15 are interchangeable, for various reasons, sometimes the dimensions of splined end 29 will differ from splined end 25. For example, the outer diameter 37 of splined end 35 of shaft 33 optionally may be smaller than outer diameter 31 of splined end 29 of first shaft 27 or vice-versa. The difference may not always be a large amount; for example, the difference in diameter may only be about $\frac{1}{16}$ inch, thus is not visible in FIG. 2. Alternately, the outer diameters 31, 37 of shafts splined ends 29, 35 could be the same, but other differences exists. Much as the number of or the configurations of the splines within each splined end 29 and 35.

A coupling 39 for coupling splined ends 29 and 35 for rotation together accommodates the dimensional differences between splined ends 29 and 15. Shafts 27 and 33 are illustrated as being spaced from coupling 39, but once assembled, with be located within coupling 39. Coupling 39 is formed in two parts that are secured together to accommodate a variety of different dimensions. Coupling 39 has a first shell 41 that is cylindrical member having a bore 43 with splines 45 extending partway along the length of bore 43. Splines 45 and bore 43 are dimensioned to match the configuration of first shaft splined end 29 so as to receive and intermesh with first shall splined end 29.

Coupling 39 has a second shell 47 that is a cylindrical member having a bore 49 with splines 51 extending partway along the length of bore 49. Splines 51 and bore 49 are dimensioned to match the configuration of second shaft splined end 35 so as to receive and intermesh with second shaft splined end 35.

Figure 3:
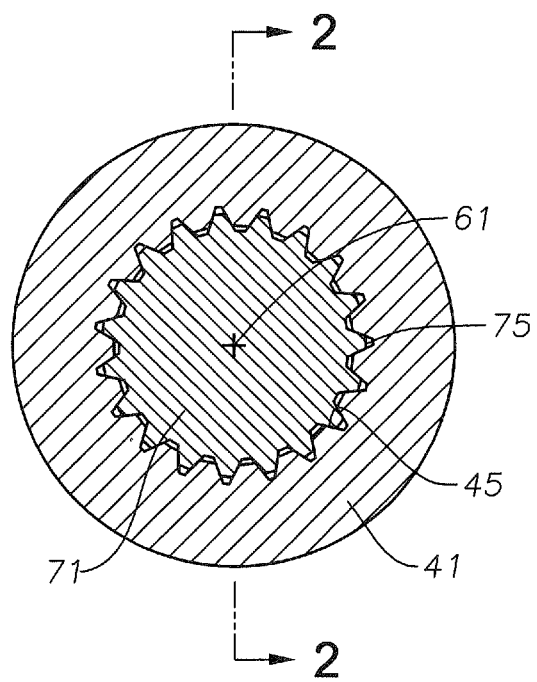
FIG. 3 is a sectional view of the coupling of FIG. 2, taken along the line 3-3 of FIG. 2.

The sectional view of FIG. 2 cuts through portions of splines 45, rather than the valleys between the splines as can be seen by the sectional line in FIG. 3. In the example shown, second shell splines 51 do not axially align with first shell splines 45. That is, an axially extending line along the crest of one of the splines 51 does not pass along a crest of one of the splines 45.

First shell 41 has an outer end 53 into which first shaft 27 stabs. First shell 41 has an inner end 55, and first shell bore 43 extends completely from outer end 53 to inner end 55. Second shell 47 has an outer end 57 into which second shaft 33 stabs. Second shell 47 has an inner end 59, and second shell bore 49 extends completely front outer end 57 to inner end 59. When coupling 39 is assembled, first shell inner end 55 will preferably be in abutment with second shell inner end 59, but a slight clearance could exist. First shell bore 43 will be coaxial with second shell bore 49 along an axis 61 of pump assembly 15 (FIG. 1).

First shell 41 has a counterbore 63 that begins at inner end 55 and extends a selected distance toward first shell outer end 53. Counterbore 63 defines a shoulder 65 axially spaced from inner end 55 and facing inner end 55. Splines 45 extend from first shell outer end 53 to shoulder 65. The length of splines 45 is preferably greater than the axial length of counterbore 63.

Second shell 47 has a counterbore 67 that begins at inner end 59 and extends a selected distance toward second shell outer end 57. Counterbore 67 defines a shoulder 69 axially spaced from inner end 59 and facing inner end 59. Splines 51 extend from second shell outer end 57 to shoulder 69. The length of splines 51 is preferably greater than the axial length of counterbore 67. The length of second shell splines 51 may be the same as the length of first shell splines 45. First and second shells 41, 47 are preferably symmetrical about axis 61.

A torque transfer member or adapter 71 connects first shell 41 to second shell 47 for rotation in unison, and also axially fixes shells 41 and 47 together. In this example, adapter 71 locates within first shell bore 43 and second shell bore 49. Adapter 71 has a first end 73 with external splines 75 (FIG. 3) that are dimensioned for intermeshing engagement with the splines of splined end 29 of first shaft 27. Adapter first end splines 75 have a length selected to place them in engagement with part of the length of splines 45. Preferably, the length of adapter first end splines 75 is less than one-half a length of splines 45.

Adapter 71 has a second end 77 with external splines 78 that are dimensioned for intermeshing engagement with the splines of splined end 35 of second shaft 33. Adapter second end splines 77 have a length selected to place them in engagement with part of the length of splines 51. Preferably, the length of adapter second end splines 78 is less than one-half a length of splines 51. Adapter second end splines 78 will normally differ from adapter first end splines 75. The difference could be in the outer diameters of second end splines 78 and first end splines 75. The difference could also be in the configuration and number of second end splines 78 as compared to first end splines 73.

Adapter 71 has a central portion 79 between first end 73 and second end 77 that is free of splines. Central portion 79 extends through counterbores 63 and 67 approximately from the inner end of first end splines 75 to the inner end of second end splines 78. Central portion 79 has a cylindrical outer surface that may base an outer diameter slightly different from or the same as the outer diameter of adapter first end 73 and adapter second cod 77. Adapter 71 is preferably symmetrical about its longitudinal axis, which coincides with axis 61. What appears to be asymmetrical differences in FIG. 2 on the left and right sides of adapter 71, as shown, are not differences; rather what appears to be different is actually due to the sectional plane of FIG. 2.

Adapter 71 may be secured to first and second shells 41, 47 in different manners. In this example, adapter 71 is secured to first shell 41 by a first retaining ring 81 that extends around adapter central portion 79. First retaining ring 81 has an inner diameter that locates within a groove on the outer surface of adapter central portion 79 and an outer diameter that locates within a groove in the inner diameter of counterbore 63. First retaining ring 81 is a resilient, biased, metal split or snap ring in this embodiment. First retaining ring 81 axially fixes first shell 41 to adapter first end 73. The engagement of adapter first end splines 75 with first shell splines 45 rotationally secures adapter 71 to first shell 41.

In this example, adapter 71 is secured to second shell 47 by a second retaining ring 83 that extends around adapter central portion 79. Second retaining ring 83 has an inner diameter that locates within a groove on the outer surface of adapter central portion 79 and an outer diameter that locates within a groove in the inner diameter of counterbore 67. Second retaining ring 83 is a resilient, metal, biased, split or snap ring in this embodiment. Second retaining ring 81 axially fixes second shell 47 to adapter second end 77. The engagement of adapter second end splines 78 with second shell splines 51 rotationally secures adapter 71 to second shell 47.

Preferably when both retaining rings 81, 83 are installed, first shell inner end 55 is in abutment or close to contact with second shell inner end 59. Alternates ways to secure adapter 71 to first and second shells 41, 47 include threads or pins.

A seal ring 85 may be installed between adapter central portion 79 and one of the counter bores 63, 67. In this example, seal ring 85 is located in a groove in first shell counterbore 63 and sealingly engages adapter central portion 79. Seal ring 85 may be elastomeric.

When assembling pump assembly 15, a coupling will be needed for connecting the shaft of each module of pump assembly 15 to the shaft of an adjacent module. Some of the modules to be joined may have identical shaft splined ends; if so conventional couplings of a unitary integral design may be employed. If some do not match, a technician will assemble a coupling 39 with first and second shells 41 and 47 to join the shafts 27, 33 that are to be coupled together. Normally, the technician will have a supply of first and second shells 41, 47 kept unattached and having different dimensions for splines 45, 51. The technician will also have a supply of adapters 71 with a variety of dimensions for first and second ends 73, 77. Once the proper shells 41, 47 and adapter 71 have been located to match the particular shaft splined ends 29, 35, the technician will assemble coupling 39 using retaining rings 81, 83.

At the well site, the technician will axially align a first shaft 27 of one of the modules with a second shaft 33 of another module. The technician will insert first shell bore 43 over first shaft 27. First shaft spline end 29 will mate with first shell splines 45 and extend into bore 43 to a point axially spaced from adapter first end 73. Normally, first shaft splined end 29 will engage a greater length of splines 45 than the length engaged by adapter first end 73. The technician will then insert second shaft splined end 35 into second shell bore 49. Second shaft splined end 35 will mate with second shell splines 51 and extend into bore 49 to a point axially spaced from adapter second end 77. Normally, second shaft splined end 35 will engage a greater length of splines 51 than the length engaged by adapter second end 77. The technician will secure the housings of the two modules together using bolted flanges or a threaded collar.

While the invention has been shown in only one of its forms, it should be apparent to those skilled in the art that it is not so limited but is susceptible to various changes.

The invention claimed is:

1. An electrical submersible pump assembly comprising:
a plurality of modules including a pump, a motor and a pressure equalizer;
a first one of the modules having a rotatable first shaft with a splined end;
a second one of the modules having a rotatable second shaft with a splined end;
a first shell having a splined bore dimensioned such that it intermeshes with the splined end of the first shaft;
a second shell having a splined bore dimensioned such that it intermeshes with the splined end of the second shaft;
the splined bores of the first and second shells being coaxially aligned along an axis of the assembly; a torque transfer member that secures the first and second shells together such that torque of the first shaft passes through the first shell to the second shell and from the second shell to the second shaft, wherein:
the torque transfer member has a first splined end that intermeshes with the splined bore of the first shell; and
the torque transfer member has a second splined end that intermeshes with the splined bore of the second shell.

2. The assembly according to claim 1, wherein:
the first splined end of the torque transfer member intermeshes with an inner portion of the splined bore of the first shell, the splined end of the first shaft intermeshing with an outer portion of the splined bore of the first shell; and
the second splined end of the torque transfer member intermeshes with an inner portion of the splined bore of the second shell, the splined end of the second shaft intermeshing with an outer portion of the splined bore of the second shell.

3. The assembly according to claim 1, wherein:
the splined bore of the first shell defines an inner diameter that is larger than an inner diameter defined by the splined bore of the second shell.

4. The assembly according to claim 1, further comprising:
a first retaining ring that inserts into mating grooves formed on the torque transfer member and in the splined bore of the first shell; and
a second retaining ring that inserts into mating grooves formed on the torque transfer member and in the splined bore of the second shell.

5. The assembly according to claim 1, further comprising:
an annular seal that seals between the first splined end of the torque transfer member and the splined bore of the first shell.

6. An electrical submersible pump assembly comprising:
a plurality of modules including a pump, a motor and a pressure equalizer;
a first one of the modules having a rotatable first shaft with a splined end;
a second one of the modules having a rotatable second shaft with a splined end;
a first shell having a splined bore having an inner end and an outer end, the outer end receiving and mating with the splined end of the first shaft;
a second shell having a splined bore having an inner end and an outer end, the outer end of the second shell receiving and mating with the splined end of the second shaft;

an adapter having a first splined end that extends through the inner end of the first shell into mating engagement with the splined bore of the first shell, the adapter having a second splined end that extends through the inner end of the second shell into mating engagement with the splined bore of the second shell;

a first fastener that secures the adapter to the first shell; and a second fastener that secures the adapter to the second shell.

7. The assembly according to claim 6, wherein:
the inner ends of the first shell and the second shell abut each other.

8. The assembly according to claim 6, wherein the splined bore of the first shell and the splined bore of the second shell are coaxial along an axis of the assembly.

9. The assembly according to claim 6, wherein:
the first splined end of the adapter extends part of a length of the splined bore of the first shell and the splined end of the first shaft extends part of the length of the splined bore of the first shell; and the second splined end of the adapter extends part of a length of the splined bore of the second shell and the splined end of the second shaft extends part of the length of the splined bore of the second shell.

10. The assembly according to claim 6, wherein the splined end of the first shaft has a different diameter from the splined end of the second shaft.

11. The assembly according to claim 6, wherein:
the first fastener comprises a first retaining ring; and
the second fastener comprises a second retaining ring.

12. The assembly according to claim 6, wherein:
the first fastener comprises a retaining ring located within aligned grooves formed in the splined bore of the first shell and on the first splined end of the adapter; and the second fastener comprises a retaining ring located within aligned grooves formed in the splined bore of the second shell and on the second splined end of the adapter.

13. The assembly according to claim 6, wherein:
the adapter transfers torque imposed on the first shell from the first shaft to the second shell, which transfers the torque to the second shaft.

14. The assembly according to claim 6, further comprising:

a seal ring between the splined bore of the first shell and the first splined end of the adapter.

15. An electrical submersible pump assembly comprising:
a plurality of modules including a pump, a motor and a pressure equalizer;

a first one of the modules having a rotatable first shaft with an end having splines;

a second one of the modules having a rotatable second shaft with an end having splines;

a first shell having a bore with an inner end, an outer end, and splines extending a selected length along the bore, the splines of the first shell dimensioned to receive and mate with the splines of the first shaft;

a second shell having a bore with an inner end, an outer end, and splines extending a selected length along the bore of the second shell, the splines of the second shell dimensioned to receive and mate with the splines of the second shaft;

an adapter having a first end that extends into the inner end of the first shell and has splines that intermesh with the splines in the bore of the first shell, the adapter having a second end that extends into the inner end of the second shell and has splines that intermesh with the splines in the bore of the second shell, the first and second ends of the adapter being coaxial along an axis of the assembly;

a first retaining ring that secures the adapter to the first shell; and a second retaining ring that secures the adapter to the second shell.

16. The assembly according to claim 15, wherein:
the splines of the first shaft engage a greater length of the splines of the first shell than the splines on the first end of the adapter; and the splines of the second shaft engage a greater length of the splines of the second shell than the splines on the second end of the adapter.

17. The assembly according to claim 15, wherein the inner ends of the first and second shells abut each other.

18. The assembly according to claim 15, wherein the adapter has a central portion located intermediate the first end and the second end that is free of splines.

* * * * *

UNITED STATES PATENT AND TRADEMARK OFFICE
CERTIFICATE OF CORRECTION

PATENT NO. : 9,702,360 B2
APPLICATION NO. : 14/586332
DATED : July 11, 2017
INVENTOR(S) : Aron M. Meyer, David Tanner and Chase Wichert Page 1 of 1

It is certified that error appears in the above-identified patent and that said Letters Patent is hereby corrected as shown below:

On the Title Page

Abstract, Line 6, the second occurrence of "has" should be --having--;
Abstract, Line 9, "adopter" should be --adapter--;

In the Specification

Column 2, Line 65, "on" should be --an--;
Column 3, Line 43, "exists. Much" should be --exists, such--;
Column 3, Line 50, "with" should be --would--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*